United States Patent [19]

Sink

[11] Patent Number: 5,431,872
[45] Date of Patent: Jul. 11, 1995

[54] COMPRESSION MOLDING METHOD FOR SHAFT SEAL

[75] Inventor: Danny R. Sink, Chesterfield County, Va.

[73] Assignee: Brenco Incorporated, Petersburg, Va.

[21] Appl. No.: 113,449

[22] Filed: Aug. 27, 1993

[51] Int. Cl.⁶ .................. B29C 37/02; B29C 43/18
[52] U.S. Cl. .................. 264/161; 264/262; 264/266; 425/112; 425/123; 425/DIG. 47
[58] Field of Search .............. 264/138, 161, 262, 266, 264/268; 425/112, 121, 123, DIG. 47

[56] References Cited

U.S. PATENT DOCUMENTS

| Re. 33,192 | 4/1990 | Bainard et al. | 264/266 |
|---|---|---|---|
| 2,982,999 | 5/1961 | Stewart | 264/266 |
| 3,004,298 | 10/1961 | Haynie | 264/266 |
| 3,276,115 | 10/1966 | Hansz | 264/266 |
| 3,767,739 | 10/1973 | Smith | 425/DIG. 47 |
| 3,936,257 | 2/1976 | Christiansen et al. | 425/DIG. 47 |
| 3,950,119 | 4/1976 | Reichenbach | 425/DIG. 47 |
| 3,988,091 | 10/1976 | Reichenbach | 425/125 |
| 4,125,247 | 11/1978 | Gabrys | 425/DIG. 47 |
| 4,155,153 | 5/1979 | Bainard et al. | 264/266 |
| 4,157,298 | 6/1979 | Bainard | 264/268 |
| 4,406,847 | 9/1983 | O'Neal et al. | 264/138 |
| 4,464,322 | 8/1984 | Butler | 264/138 |
| 4,578,856 | 4/1986 | Butler | 264/277 |
| 4,613,143 | 9/1986 | Butler | 277/134 |
| 4,822,058 | 4/1989 | Butter et al. | 264/138 |
| 4,824,357 | 4/1989 | Christiansen | 425/DIG. 47 |
| 4,867,926 | 9/1989 | Matsushima | 264/262 |
| 4,957,680 | 9/1990 | Saxod et al. | 264/266 |
| 4,969,653 | 11/1990 | Breen | 277/153 |
| 5,186,548 | 2/1993 | Sink | 277/153 |

FOREIGN PATENT DOCUMENTS

46-23681  7/1971  Japan .

Primary Examiner—Jay H. Woo
Assistant Examiner—Robert B. Davis
Attorney, Agent, or Firm—John F. C. Glenn

[57] ABSTRACT

Compression molding of elastomer to form an annular sealing lip bonded to a sintered polytetrafluoroethylene line over the lip, and to bond the elastomer to an annular metal case for the seal. The mold elements, anchoring the inner margin of the liner preform during molding, slide against each other for concentric alignment, bend the metal case to control back pressure on the elastomer being applied to the liner, and form a thin annular link of elastomer between the seal formed in the mold and the excess elastomer to be trimmed from the seal.

10 Claims, 9 Drawing Sheets

COMPRESSION MOLDING METHOD FOR SHAFT SEAL

FIELD OF THE INVENTION

The invention is in the field of compression molding of an elastomeric shaft seal bonded to an annular metal case and having an annular molded lip covered by a layer of sintered polytetrafluoroethylene or the like applied and bonded to the lip during the molding operation.

BACKGROUND OF THE INVENTION

An elastomeric annular lip is conventionally used around a shaft to hold back lubricant on one side of the lip, and to exclude contaminants on the other side. Improved wear can be obtained by bonding a liner of sintered polytetrafluoroethylene to one or both sides of the lip in the course of molding the elastomeric body of the seal; for example, as disclosed in Japanese patent application Kokuku 460-23681 published Jul. 7, 1971 (Tauzuki), and U.S. Pat. No. Re 33,192 issued Apr. 3, 1990, (Bainard et al.), U.S. Pat. Nos. 4,406,847 issued Sep. 27, 1983 (O'Neal et al.), and 4,613,143 issued Sep. 23, 1986 (Butler). The O'Neal et al. patent discloses a problem of excessive rejects, when applying the liner over the apex of the lip (disclosed in the Bainard et al. reissue patent), and suggests reducing rejects by use of an abutment in the mold which engages and restrains the outer periphery of the sintered liner during the molding operation. Each of the above-listed references discloses bonding the elastomeric body of the seal to its metal case during the molding operation, without any bending of the metal case during molding, and after molding trimming the molded product by cutting through the sintered liner where its pre-molded thickness is substantially undiminished, while also cutting through an adjacent greater thickness of the elastomeric body. Bending of the metal case during molding is disclosed in U.S. Pat. No. 3,004,298 (Haynie), but not in connection with applying a lip liner during molding.

SUMMARY OF THE INVENTION

The invention improves the production of annular shaft seals of the kind having an annular lip formed on an annular elastomeric body, having an annular liner of sintered polytetrafluouroethylene or the like applied during molding of the lip to extend over the apex of the lip, and having an annular metal case bonded to the elastomeric body. The improvements include the following:

(1) Preforms of the elastomeric body and sintered liner are placed between a pair of mold elements and compressed between them to cause the elastomer to press the inner margin of the liner preform into a circular recess beneath it. The elastomer also flows into the recess, which anchors the liner preform and restrains it from unequal radial outflow so that it will form symmetrically during its subsequent compression in the mold.

(2) The annular metal case has a circular inner edge which extends around and is slightly spaced from the mold core and initially resists pressure of the compressed elastomer to move into a small annular chamber in the mold beyond the case edge. Further movement of the mold builds up pressure on the elastomer to cause it to force the liner preform against the part of the mold that forms the liner over the lip of the seal and forms hydrodynamic channels of conventional minute depth and width in the liner. This pressure first reaches a peak when the mold elements come together enough to engage the margin of the case around its inner edge. Further movement of the mold elements together cups the margin and bends its edge further from contact with the mold core, thus allowing the elastomer to flow into the mold chamber beyond the case margin, and against both sides of the cupped portion of the case margin. This occurs near the end of the mold movement. High peak mold pressures can be used because contact of the upper and lower mold members with the metal case prevents excess flow (or uncontrolled flash) of the elastomer past the areas of contact. Normal variations of case metal thickness do not interfere with the cupping action of the mold members or the prevention of uncontrolled flash.

Figure 7:
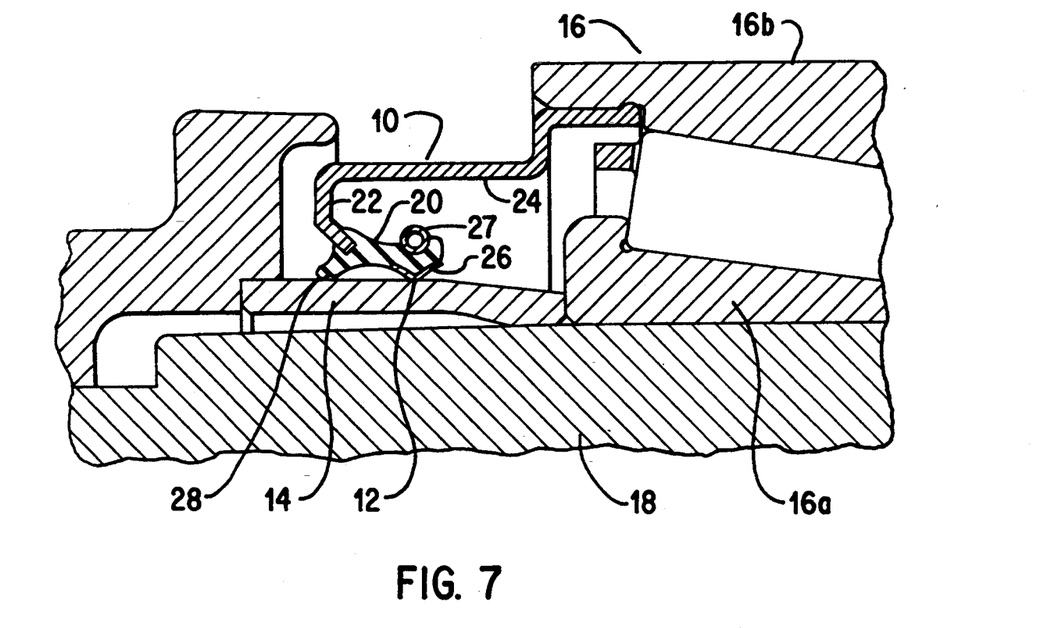
FIG. 7 shows partially broken away section through the axis of a shaft mounting a bearing assembly which includes a seal made as illustrated in the preceding figures.

(3) During final movement of the mold its members have a pair of annular corners which move into overlapping relation to shear through part of the liner, leaving a thin annular connecting link of solely liner material between the overlapped corners of the mold elements. When the mold is opened and the molded contents are removed, the link is torn apart or trimmed by cutting through to remove the part radially inward of the link. After such separation the remaining part is the seal molded to the case as shown in FIG. 7. If trimming is necessary it is facilitated by the fact that cutting through a very thin section of a single material is easier than cutting through a bonded pair of materials having different cutting characteristics. Also, the link is bordered by edges that tend to bear against the cutting blade as it advances through the cut. This causes the molded seal to stay radially concentric with the blade as it cuts, resulting in a cut edge around the molded seal that is concentric with its center.

(4) Accurate control of concentricity of the annular parts of the mold is obtained by piloting the relatively movable annular mold elements into concentric alignment with each other by sliding engagement of opposed surfaces on them, especially during controlled release from the product-forming mold cavity of an excess part of the elastomer initially placed in the cavity. This is particularly useful in view of the high pressures and close tolerances needed in the mold, and is more positive than the conventional practice of piloting compression molds into concentric relation by means of opposed surfaces separated by a thin stream of excess elastomer being squeezed out of the mold cavity. It also permits determining clearances to provide a passage for the stream of excess elastomer, based on considerations of optimum back pressure in the mold cavity and for optimum evacuation of internally generated gases in the molding process, without need to compromise with inconsistent clearance requirements when the passage is also used for piloting one mold member into concentricity with the other.

These and other details, objects and advantages of the invention will become apparent as the following disclosure proceeds.

DETAILED DESCRIPTION OF PRESENT PREFERRED EMBODIMENTS

Figure 4A:
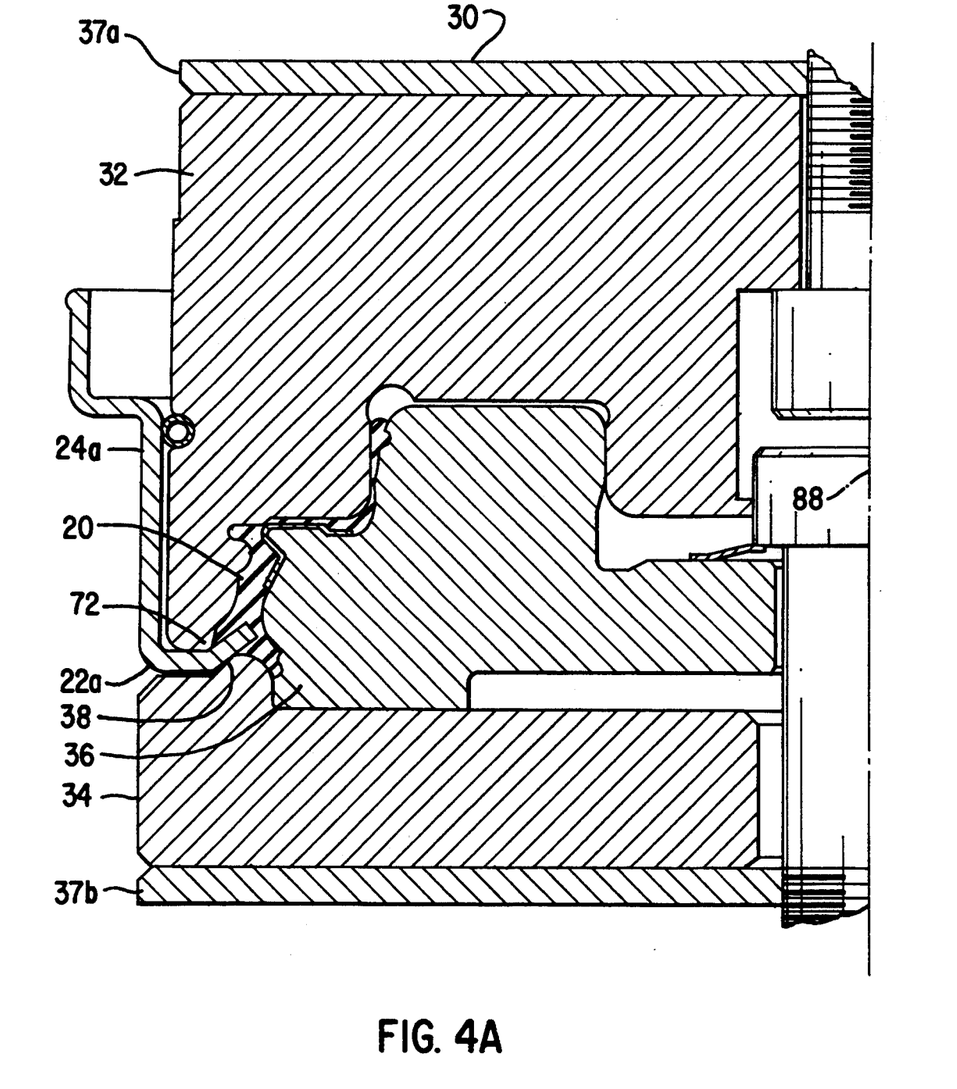
FIG. 4A shows the apparatus of FIG. 1A when the molding elements have bent a marginal portion of the case flange enough to cause the elastomer to flow around the bent portion and press against both sides of the bent portion.
Figure 4B:
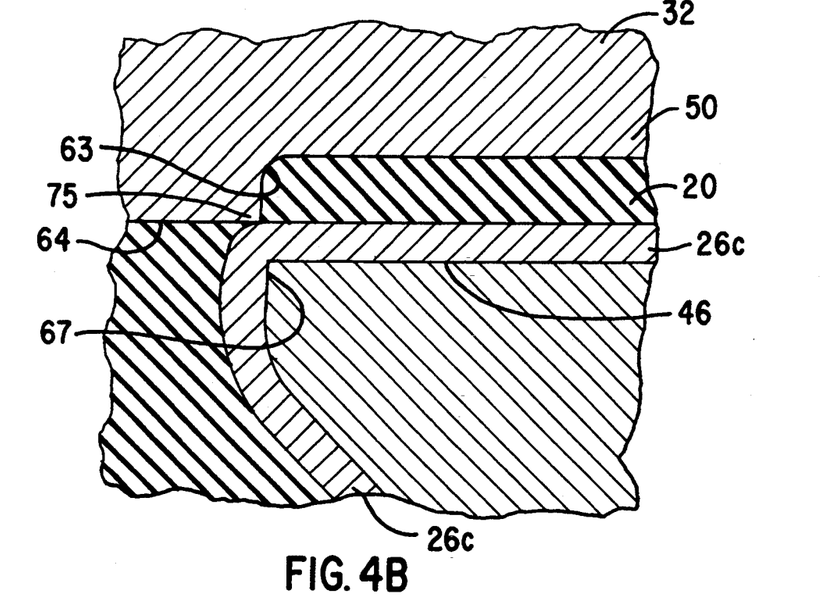
Figure 5A:
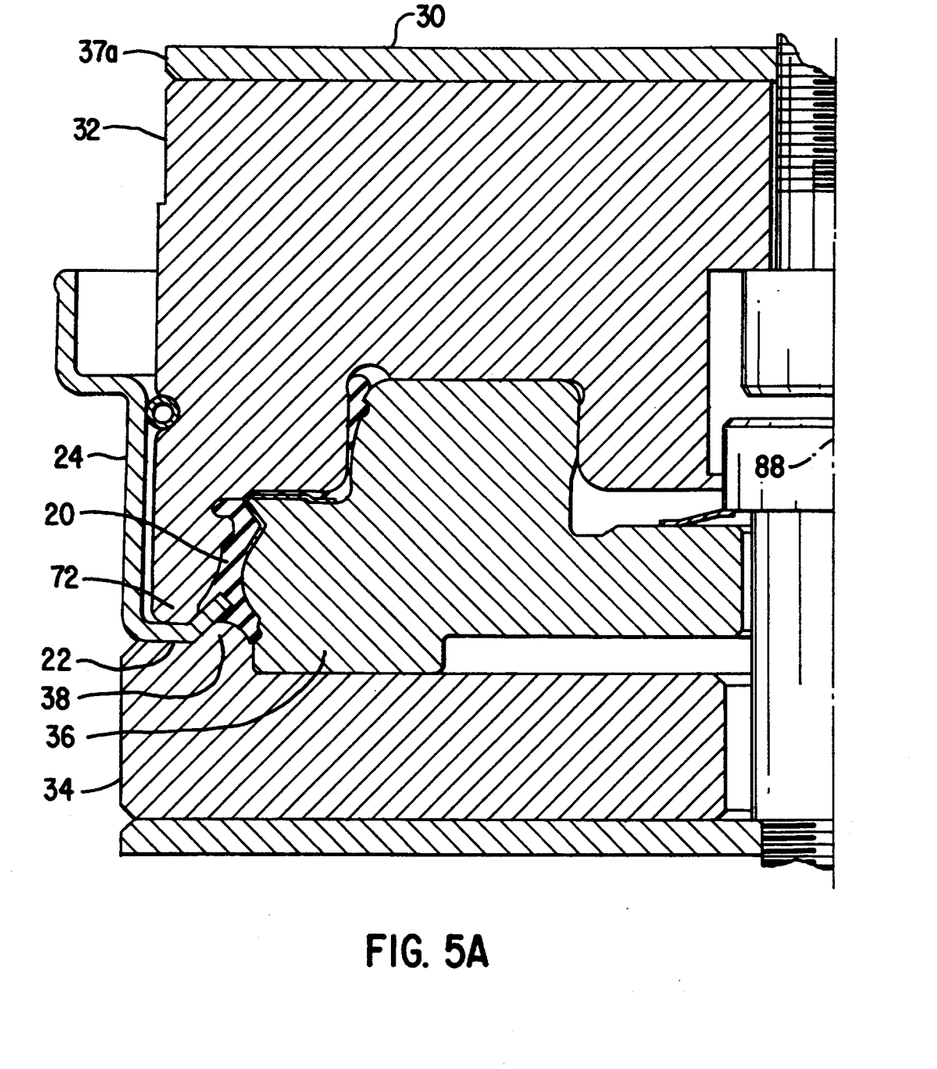
FIG. 5A shows the apparatus of FIG. 1A when the mold has closed.
Figure 5B:
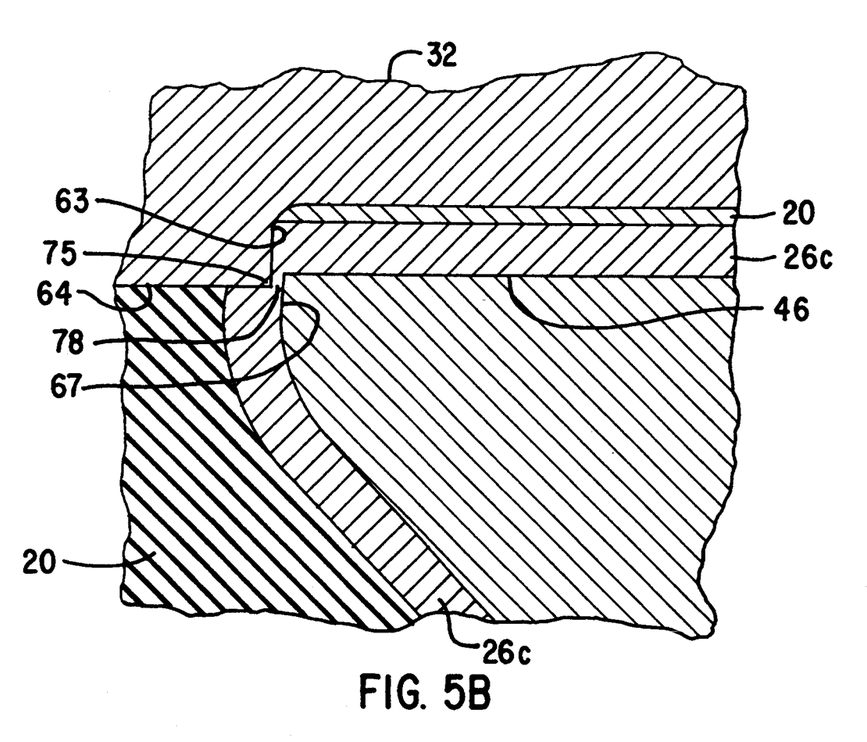
Figure 6:
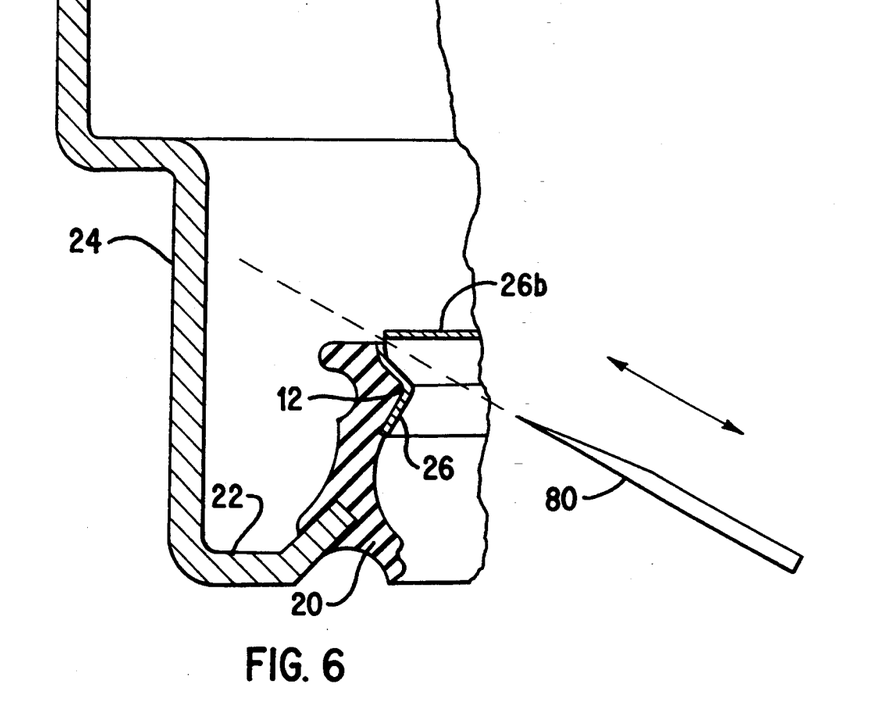
FIG. 6 shows a further enlarged view of a portion of FIG. 5A, omitting the mold elements and adding a schematic view of a trimming blade.

Referring now to the accompanying drawings, the apparatus shown in FIGS. 1A to 5A and related FIGS. 1B to 5B and 1C, produces an annular molded product which is trimmed after molding (FIG. 6). The remainder after trimming is an annular shaft seal 10 (FIG. 7).

As shown in FIG. 7, the seal 10 has an annular sealing lip 12 which extends around and slides against an annular wear ring 14 at one end of the inner race 16a of a roller bearing 16. Lip 12 prevents escape of oily lubricant (not shown) confined in an annular space between lip 12 and roller bearing 16. The seal 10 has an annular molded body of an elastomer 20 bonded to a flange 22 of an annular metal case 24. A liner 26 of sintered polytetraflouroethylene, or other suitable liner material, covers lip 12 and is bonded to the underlying elastomer where it is molded to form lip 12. Seal 10, ring 14 and bearing 16 all extend around a shaft 18, which is secured to wear ring 14 and to inner bearing race 16a. Outer bearing race 16b is secured to lip 12 through seal case 22. A garter spring 27 coaxes the lip liner 26 against wear ring 12. Seal 10 also has a molded lip 28 which slidably engages wear ring 14 to prevent outside dust and the like from entering the space between the lips 12 and 28.

Figure 1A:
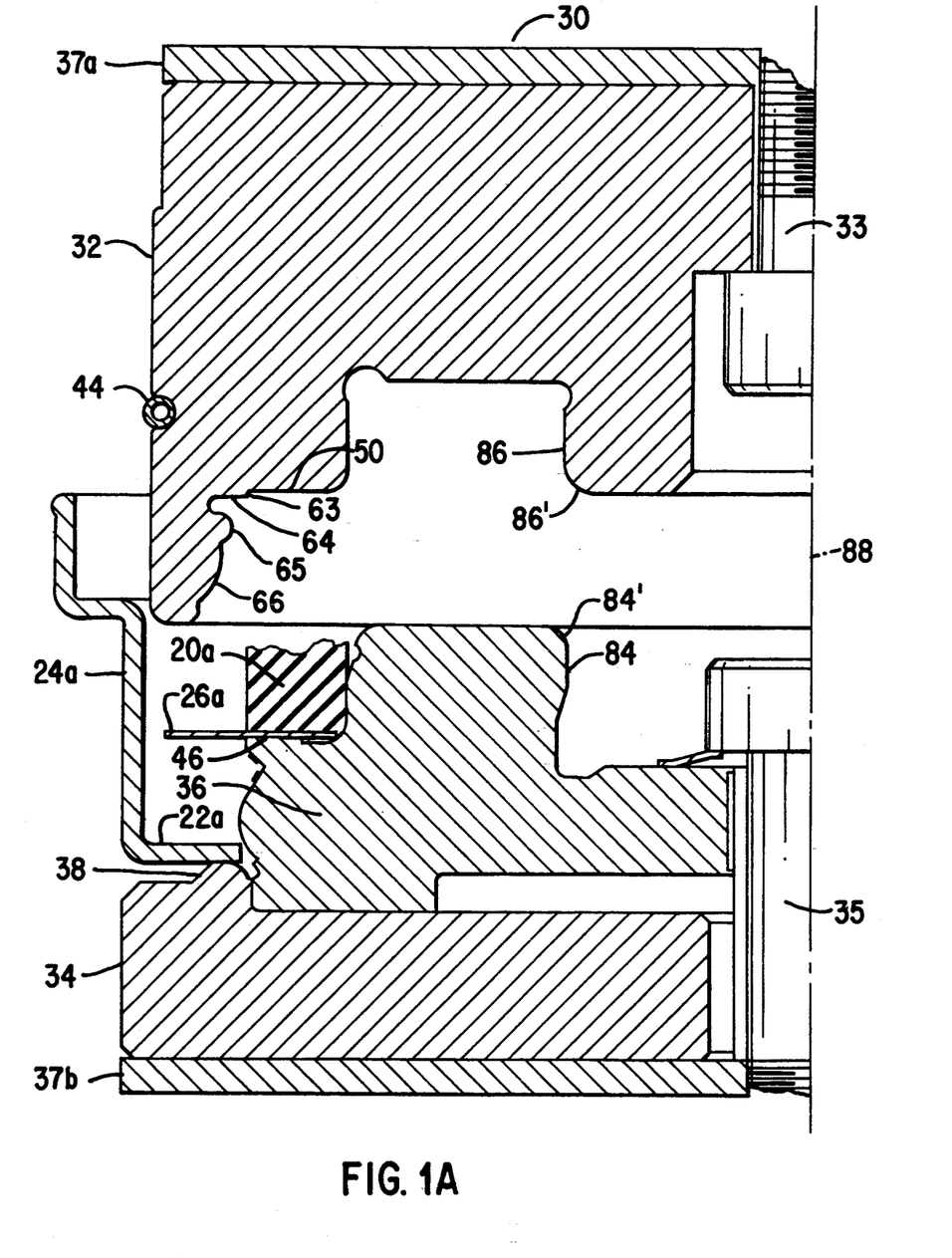
FIG. 1A shows a schematic view of a section through the axis of an annular molding apparatus embodying the invention, in its open position, with concentric annular preforms of elastomer, sintered liner and metal case in place.
Figure 1B:
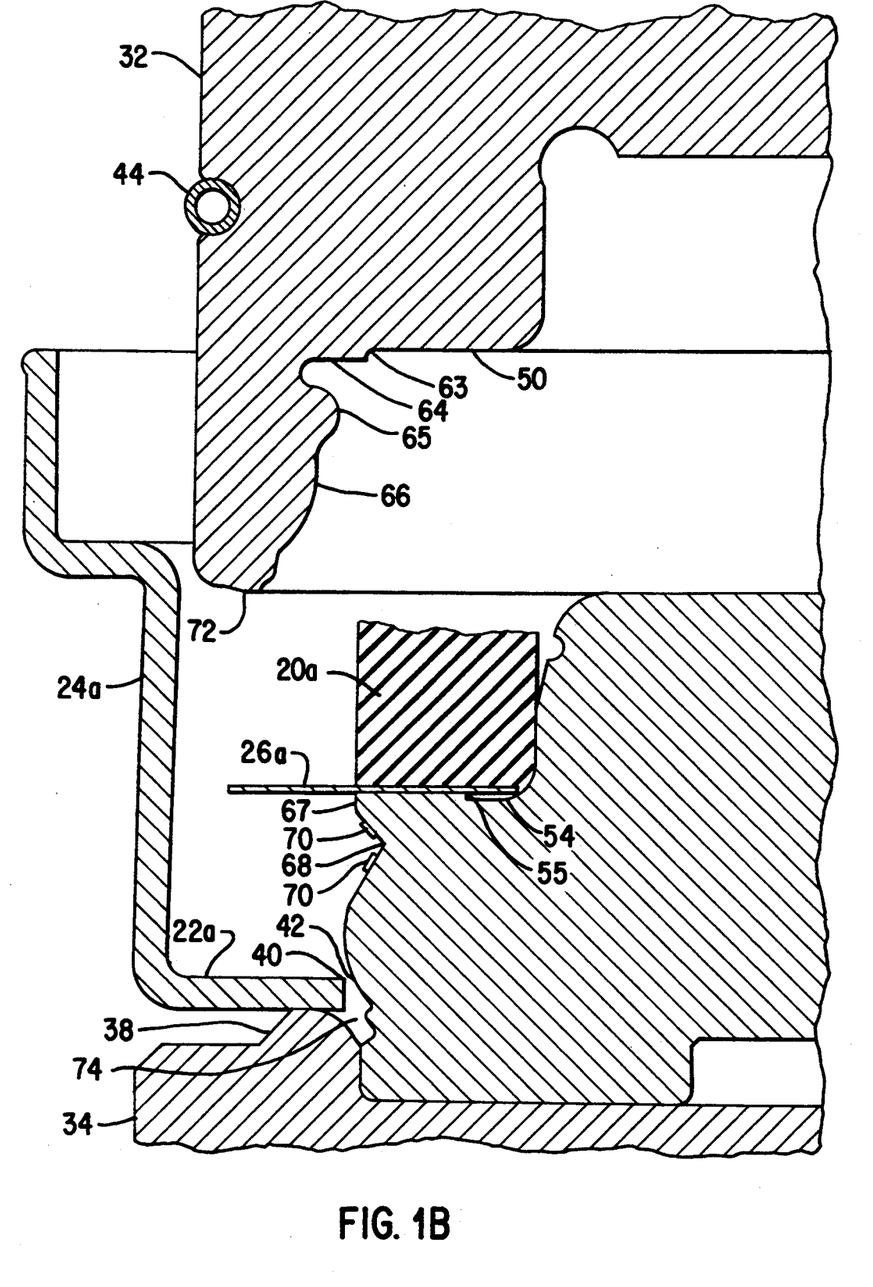
FIGS. 1B, 1C, 2B, 3B, 4B and 5B each show an enlarged and broken away portion of the corresponding one of the FIGS. 1A to 5A which has the same prefix number.

Referring now to FIGS. 1A and 1B, molding apparatus 30 for making seal 10 comprises an annular upper mold member 32 and a lower mold assembly comprising an annular lower mold member 34 supporting and positioning an annular central core member 36. The accompanying drawings and following description refer to the upper mold member 32 being fixed and the lower mold assembly being vertically movable, based on use of an up acting press having a heated upper platen 37a in a fixed position and a heated lower platen 37b which the press moves vertically. The reverse would also be feasible, using a down acting press.

In the illustrated embodiment of the invention, a bolt 33 secures the upper mold member 32 to the fixed upper platen 37a. A bolt 35 secures core 36 and mold member 34 together and both of them to platen 37b. When platen 37b moves down bolt 35 pulls down core 36 and mold member 34 to disengage them from the upper mold member 32 at the end of a molding operation. The platen 37b engages the bottom of lower mold member 34 to support and raise it and core 36.

Figure 3A:
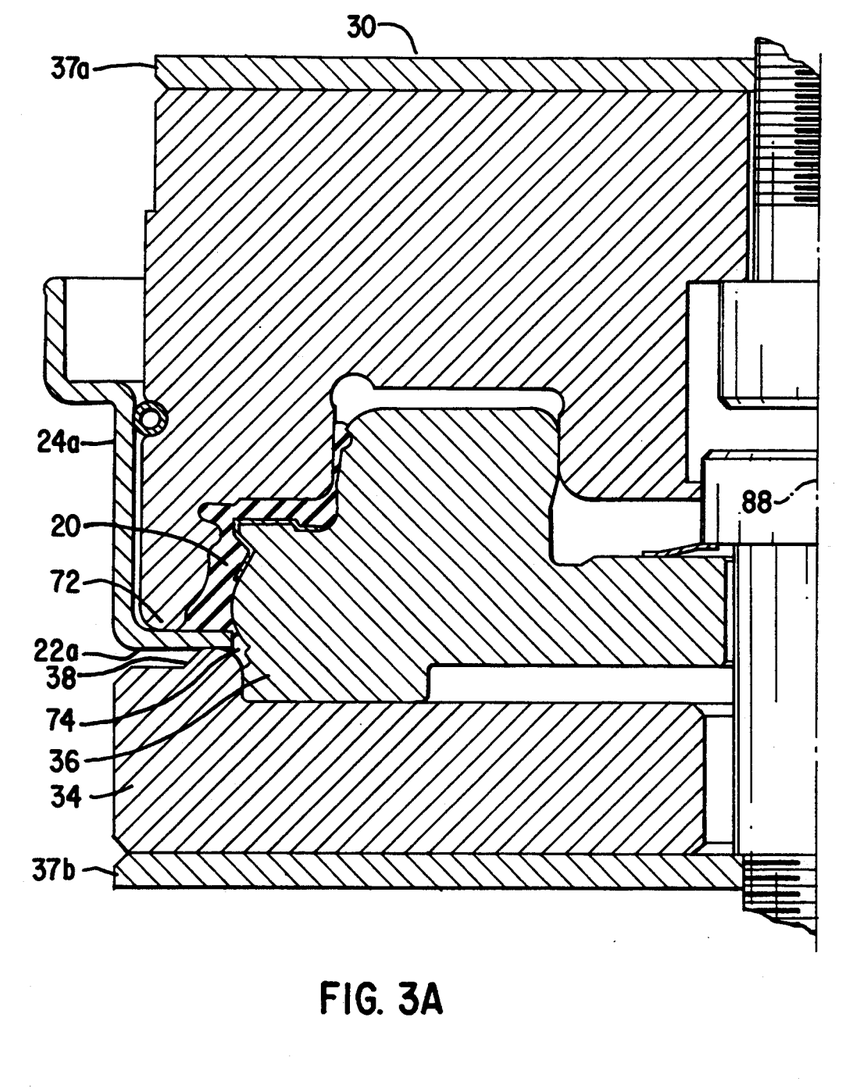
FIG. 3A shows the apparatus of FIG. 2A when the molding elements have further closed to cause the elastomer to press the liner into place, and to press the elastomer against one side of an annular flange of the metal case.
Figure 3B:
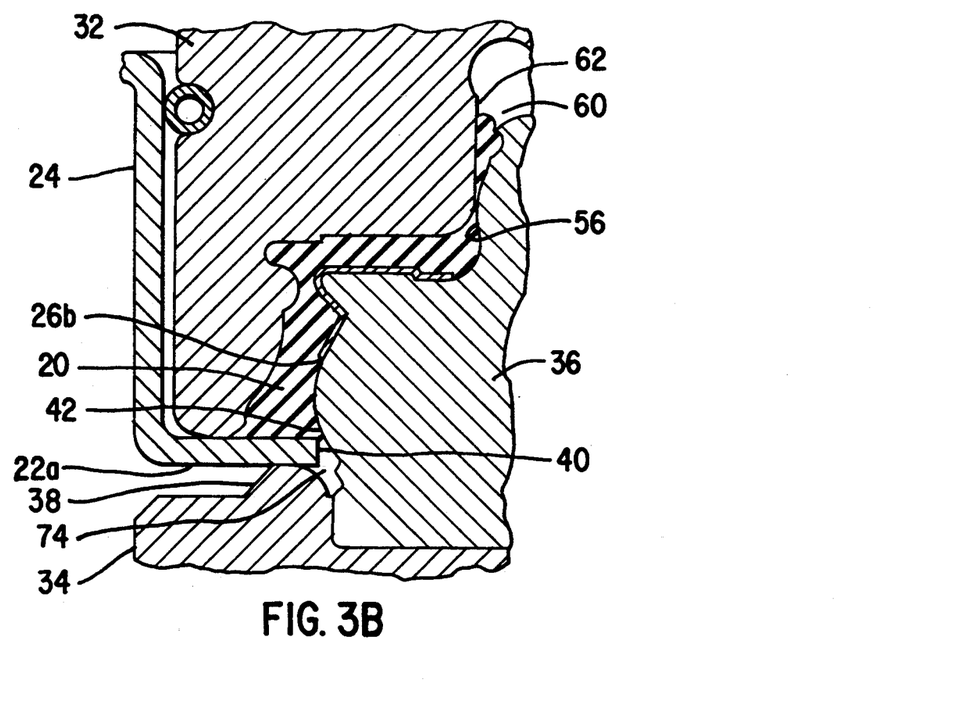

After lowering platen 37b to fully separate lower mold member 34 and core 36 from the upper mold member 32, a metal annular preform 24a for the case 24 is placed between the mold members with its inturned preform flange 22a resting on an annular rib 38 which is integral with and projects upwardly from lower mold member 34. The inner periphery of edge 40 of flange 22a extends around an opposite annular outer surface 42 of core 36. As long as the initial shape of case flange preform 22a remains unchanged its edge 40 is spaced slightly from core surface 42, enough to avoid scoring surface 42 when rib 38 moves up but close enough to limit downward outflow of elastomer 20 between edge 40 and core surface 42 and thereby build up back pressure on elastomer above flange 22a as the mold further closes (FIGS. 3A and -B). Case 24 is held concentric with upper mold member 32 by a garter spring 44 seated in a groove around mold member 32 and slidable against case 24.

A liner preform ring 26a of the material of liner 26 is placed on a horizontal annular ledge 46 around core 36 below the core's upper end. The liner preform ring 26a is shaped like a flat washer about 0.010 to 0.050 inch thick, and is preferably about 0.015 and 0.030 inch thick. It is cut from a tube of cast and sintered polytetraflouroethylene or the like, and is in sintered or other non-rolled condition so that its physical and mechanical properties are substantially the same in all directions from the center of the ring. The liner preform 26a may be coated with agents to bond it to elastomer 20 during molding.

The loading of the lower mold member 34 and core 36 is completed by placing a thick preform ring 20a of elastomer 20 on liner preform 26a. For most applications the present preferred polymer for elastomer 20 is a nitrile buna synthetic rubber, which may be admixed with other constituents, such as reinforcing filler, a low friction enhancer such as graphite, or a bonding agent, for example.

Figure 1C:
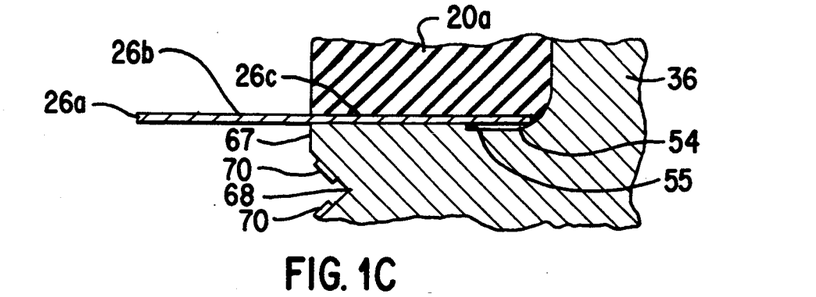
Figure 2A:
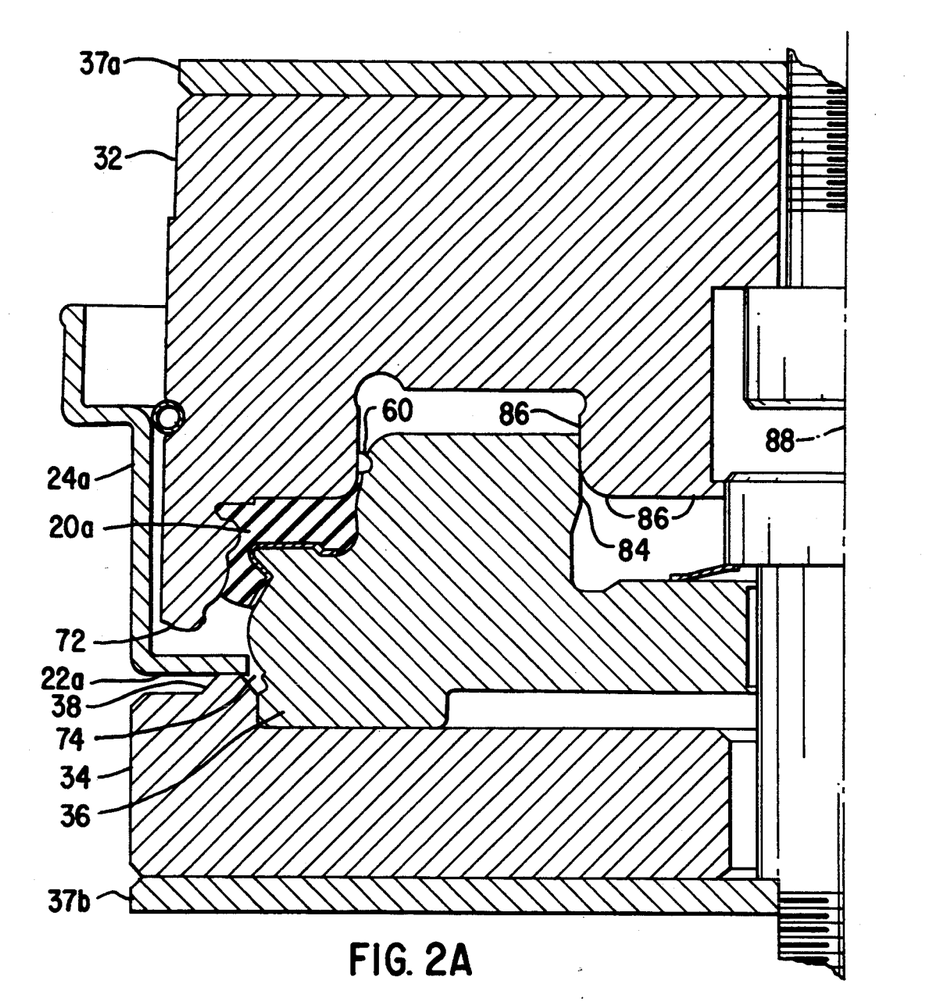
FIG. 2A shows the apparatus of FIG. 1A when the molding elements have begun to close and press against the preforms.
Figure 2B:
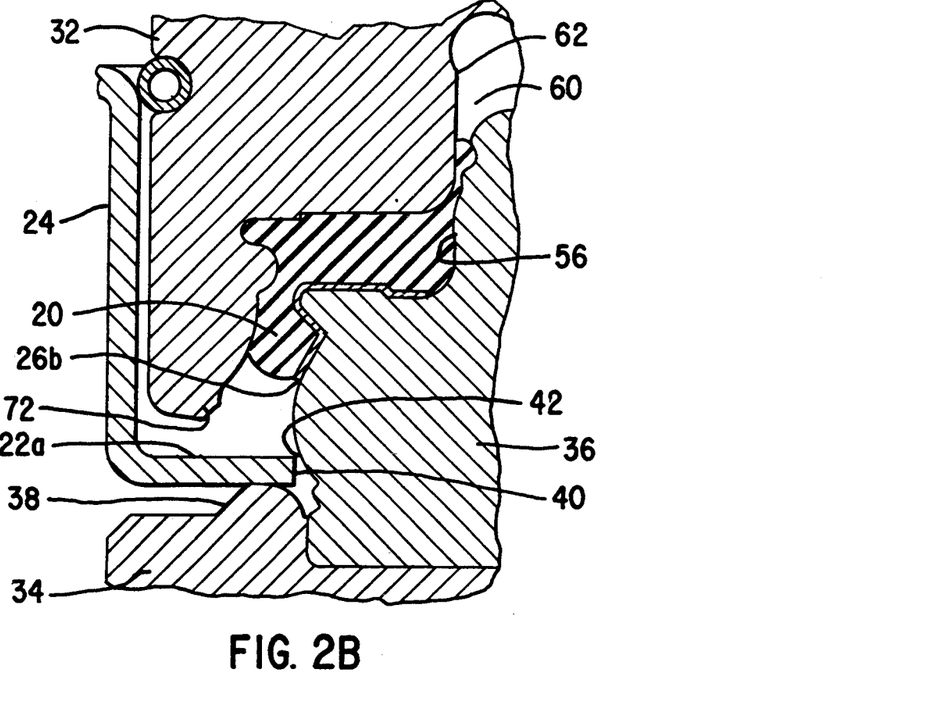

As shown in FIGS. 2A and -B, the initial upward closing movement of platen 37b raises core 36 and causes its upwardly facing ledge 46 to begin to squeeze elastomer preform 20a against a downwardly facing annular ledge 50 of upper mold member 32. This causes elastomer preform 20a to press the inner margin of liner preform 26a into an annular recess 54 beneath it in core 36. Recess 54 has a cylindrical wall 55 extending vertically between the inner periphery of the top of ledge 46 and the outer periphery of the bottom of recess 54 (FIG. 1C). Wall 55 forms an abutment which anchors the liner preform 26a against forces tending to pull unevenly against it in directions radially outward from recess 54. At about the same time, the elastomer preform 20a is squeezed radially inward against and thence upwardly along a convex annular surface 56 of core 36.

Surface 56 bounds and extends upwardly from the radially inner periphery of recess 54, to form the radially inner side of a narrow annular passage 60 between surface 56 and a concave annular surface 62 of mold member 32 (FIG. 1B) after the mold begins to close (FIGS. 2B and 3B). Passage 60 releases the excess elastomer in preform 20a beyond the amount filling the mold cavity that forms the finished seal 10 when the mold has closed. As the mold closes it narrows the minimum spacing of passage 60 between surfaces 56 and 62 to produce strong back pressure on the elastomer in the mold cavity during molding and bonding.

The squeeze on elastomer preform 20a also causes it to flow radially outwardly and downwardly to engage surrounding interior annular surfaces of upper mold member 32 which form most of the annular outer periphery of the elastomeric body 20 of seal 10. These surfaces, starting at the top (FIG. 1B), include a narrow cylindrical surface 63 extending down from and surrounding ledge 50, a surface 64 extending horizontally outward from the bottom of surface 63, a surface 65 which forms the groove for garter spring 27, and a surface 66 which extends down from the surface 65 to form the back of seal 10 between garter spring 27 and case flange 22.

The liner preform 26a has an outer margin 26b which initially projects radially outwardly from ledge 46 and recess 54 (FIG. 1C) and an inner margin 26c resting on ledge 46. As elastomer 20 is initially squeezed it presses liner preform margin 26b down (FIGS. 2B and 3B) over the annular outer corner of ledge 46 where its top surface intersects its cylindrical outer side surface 67 (FIG. 1B). This cups liner margin 26b downwardly, as shown in FIGS. 2A and -B.

As shown in FIGS. 3A and -B, continued upward movement of mold member 34 and core 36 further squeezes the elastomer 20 between ledges 46 and 50. The increasing pressure on elastomer 20 causes it to make full contact with all of the interior surfaces of upper mold member 32 surrounding the elastomer between ledges 46 and 50, including surfaces 63–67. This causes the elastomer to press radially inwardly against the downwardly cupped liner portion 26b, thereby tightly pressing it against the adjacent outer surface of a groove 68 of V-shaped cross section around the outside of core 36, and thus forming the liner 26 on lip 12 of the seal 10 shown in FIG. 10. Small ridges 70 on groove 68 (FIG. 1C) form hydrodynamic channels of conventional nature in liner 26.

When the lower mold member 34 has reached the position shown in FIG. 3A, elastomer 20 presses downwardly against but cannot pass beneath the preform flange 22a, which closes off the lower end of the cavity above it between upper mold member 32 and core 36 as long as flange edge 40 remains close to core surface 42 as shown in FIG. 3B.

As shown in FIGS. 2B and 3B, mold member 32 has a downwardly projecting annular rib 72 which is radially outward of rib 38 of lower mold element 34. As platen 37 moves up to the position show in FIG. 4A, rib 38 cups the inner marginal portion 22b of case flange 22a upwardly against rib 72, thereby moving flange edge 40 away from core surface 42. This in effect opens a gate formed by preform flange 22a so that the elastomer 20 can flow past the cupped flange portion 22b into an annular cavity 74 between lower mold element 34 and core 36 and extending beneath the position of flange 22a when it rested on rib 38 before being cupped (FIG. 2B and 3B). The elastomer 20 entering cavity 74 forms lip 28 and enables the elastomer to bond to both sides of case flange 22 along its edge 40.

When the mold reaches the position shown in FIGS. 4A and 4B, ledge 50 overlies ledge 46 with a layer of elastomer surrounded by cylindrical surface 63 and the liner preform part 26c between them. Horizontal surface 64 is at the level of the top of liner preform part 26c on ledge 48. Cylindrical surface 63 around ledge 50 is aligned concentric with cylindrical surface 67 around ledge 46, but is of slightly greater radius than surface 67 from mold axis 88. When ledge 46 continues to move up to close the mold, as shown in FIGS. 5A and -B, the annular corner 75 at the intersection of surfaces 63 and 64 cuts vertically through liner preform 20a where it bends over ledge 46 until corner 75 and surface 64 are a short distance below the top of ledge 46. Meanwhile, all of the elastomer 20 surrounded by surface 63 had been separated from the elastomer 20 in the mold cavity where the finished seal 10 is formed, upon reaching the position shown in FIGS. 4A and -B. Further upward movement of ledge 46 squeezes the elastomer 20 above ledge 46 through passage 60 until the residual elastomer is so thin as to require too much force for further displacement. The liner material is too resistant to lateral flow for the liner portion 26b on ledge 46 to be substantially reduced in thickness or changed in area by compression in the mold.

When lower mold element 34 and core 36 reach their upper limit (FIGS. 5A and -B), the top of the liner preform part 26c on ledge 46 is at substantially the level of the downwardly facing ledge 50 of upper mold member 32. That level is spaced above the level of the top of ledge 46 by the amount of thickness of the liner preform 26, plus the thickness of a small residue 76 of elastomer 20 thereon at the end of closing of the mold. An annular link 78 of liner material is formed where surface 63 overlaps surface 67. Link 78 connects the seal 10 part of the molded product with remainder that is to be discarded. The part of the molded product below link 78 is the seal 10 (elastomer body, lip liner and case) shown in FIG. 7. The part above link 78 is trimmed away by removing the molded product from the mold and severing link 78 by tearing through it or by using a trimming blade 80 to cut through it as shown in FIG. 6. The thicker body of elastomer 20 along each end of the link helps to guide the blade along the link being cut, or the link along the blade. The blade is gradually advanced point first into the link while the link is rotated around the blade.

All of the above-mentioned circular and annular mold elements must be held in accurate concentric relation during molding. Rather than pilot them into concentric relation by conventional use of spaced surfaces separated by elastomer 20 (such as along the narrow part of the annular passage 60), core 36 and hence the attached lower mold member 34 are brought into concentric alignment with fixed upper mold member 32 when a cylindrical surface 84 on core 36 slides against a cylindrical surface 86 on mold member 32 (FIGS. 2A–5A). A beveled annular surface 84' leads into the top of surface 84, and a beveled annular surface 86' leads into the bottom of surface 86, to guide surface 84 into engagement with surface 86 when core 36 moves up from its FIG. 1A position to its FIG. 2A position. Mold member 32 and surface 86 are in fixed concentric relation to each other and to the mold axis 88, and surface 84 is in fixed concentric relation to core 36. Bolt 35 allows lateral adjustment of mold member 34 and core 36 relative to upper mold member 32 in response to pressure of surface 84 on surface 86.

The mold members 32 and 34 and core 36 are heated during the mold operation to temperatures suitable for vulcanization of the material used, such as 325° to 410° for Buna-N rubber. The upward movement of platen 37 is normally steadily progressive and is completed within a few seconds. The pressure in the mold cavity where the seal body is formed is as high as permitted by the equipment. It is preferable to use molding apparatus having means to draw a vacuum in the molding chamber to minimize the chance of developing voids or blisters in or on the elastomer.

While present preferred embodiments and methods of the invention have been illustrated and described, it will be understood that the invention is not limited thereto but may be otherwise variously embodied and practiced.

What is claimed is:

1. A method of making a shaft seal having an annular elastomeric body with a molded annular lip around it, an annular metal case bonded to the body, and an annular liner over and bonded to the apex and adjacent sides of the molded lip, comprising the steps of:

Placing an annular preform of elastomer over an annular preform of sintered polymer wear liner material in sheet form, and placing both annular preforms on an upwardly facing annular ledge of a mold member;

Placing an annular metal case in the mold with an annular flange of the case separating a seal-forming cavity of the mold into a larger cavity and a smaller cavity;

Maintaining the temperature of the mold while it is being closed at a level at which the elastomer flows plastically within the mold while the liner material retains substantially its original sheet thickness over most of its area;

Partially moving the mold toward final closed position and in doing so enclosing most of the elastomer and part of the liner material in said larger seal-forming cavity in the mold; and Contracting the cavity to squeeze the elastomer in said larger cavity and thereby press the liner material into and against an annular groove in the mold to form a rib having a liner-covered apex and adjacent sides.

2. The method of claim 1, in which the elastomer is a synthetic rubber of buna nitrile polymer, and the liner material is of sintered fluorocarbon polymer.

3. The method of claim 2, in which the fluorocarbon polymer is polytetrafluorethylene.

4. The method of claim 1, comprising the steps of drawing part of the liner material down against an outer peripheral surface around the ledge and bringing relatively moving annular parts of the mold into overlapping relation and moving them to shear through the liner material lengthwise between its opposite faces, around said peripheral surface of the ledge, thereby leaving the liner material on one side of the shear line as an annular connecting link between the part of the product in the mold which is above the ledge and the other part of the product.

5. The method of claim 4, in which said other part of the product in the mold is an annular seal for a bearing around a shaft.

6. The method of claim 4, comprising removing the product from the mold, and tearing along said link to separate said parts of the product.

7. The method of claim 4, comprising removing the product in the mold from the mold, and the link with a blade while guiding the blade against a thicker portion of the liner material next to the link to separate the said parts of the product.

8. The method of claim 1, in which squeezing of the elastomer during said partial movement of the mold causes part of the elastomer preform to flow radially outward and downward to enter said larger cavity portion, and causes a radially inward part of the elastomer preform to flow down into an annular recess surrounded by the ledge supporting the elastomer and liner preforms, whereby the part of the liner material and elastomer in the recess acts as an anchor against eccentric radially outward movements of the elastomer and liner preforms during molding.

9. The method of claim 1, in which said annular flange of the metal case is inturned and substantially prevents flow of elastomer past the flange from said larger seal-forming cavity during said squeezing of the elastomer to press the liner material against said annular groove in the mold, and comprising the step of further closing the mold to bend the case flange and cause elastomer to flow past the periphery of the bent flange into said smaller cavity and bond to both sides of the flange periphery.

10. The method of claim 1, comprising maintaining concentricity of a fixed part and a relatively moving part of the mold during its closing movement by sliding surfaces of said parts of the mold against each other where substantially none of the elastomer is present between said surfaces, and releasing excess elastomer preform from the mold through a passage apart from said sliding surfaces.

* * * * *